United States Patent
Xu et al.

(10) Patent No.: US 12,469,909 B2
(45) Date of Patent: Nov. 11, 2025

(54) COVER ASSEMBLY FOR BATTERY AND BATTERY

(71) Applicant: Hithium Tech HK Limited, HongKong (CN)

(72) Inventors: Weidong Xu, Fujian (CN); Qiqi Huo, Fujian (CN); Nan Zhang, Fujian (CN); Ziqi Yi, Fujian (CN); Zuyu Wu, Fujian (CN)

(73) Assignee: HITHIUM TECH HK LIMITED, Hongkong (CN)

( * ) Notice: Subject to any disclaimer, the term of this patent is extended or adjusted under 35 U.S.C. 154(b) by 296 days.

(21) Appl. No.: 17/887,484

(22) Filed: Aug. 14, 2022

(65) Prior Publication Data
US 2023/0053460 A1 Feb. 23, 2023

(30) Foreign Application Priority Data
Aug. 17, 2021 (CN) .......................... 202121929993.2

(51) Int. Cl.
*H01M 50/155* (2021.01)
*H01M 50/148* (2021.01)
(Continued)

(52) U.S. Cl.
CPC ....... *H01M 50/155* (2021.01); *H01M 50/152* (2021.01); *H01M 50/154* (2021.01); *H01M 50/409* (2021.01)

(58) Field of Classification Search
CPC ..... H01M 50/154–164; H01M 50/179; H01M 50/147–198; H01M 50/55;
(Continued)

(56) References Cited

U.S. PATENT DOCUMENTS

2006/0183020 A1* 8/2006 Davidson ............ H01M 50/184
429/165
2011/0200870 A1* 8/2011 Kim .................... H01M 50/567
429/179
(Continued)

FOREIGN PATENT DOCUMENTS

JP 2009087882 A * 4/2009

OTHER PUBLICATIONS

JP2009087882A—English Translation—Accessed via Espacenet Aug. 20, 2024 (Year: 2024).*

*Primary Examiner* — Christina Chern
*Assistant Examiner* — Bethany C Garcia

(57) ABSTRACT

Provided are a cover assembly for a battery and a battery. The cover assembly for the battery includes an elastic cover, an insulating cover, a frame support member and a terminal column assembly. The insulation cover is embedded in one end of the elastic cover. The frame support member has a greater hardness than the elastic cover and the insulating cover. The frame support member is embedded in the other end of the elastic cover. The elastic cover has an encapsulation portion disposed on an outside, in a radical direction, of the insulating cover and the frame support member. The encapsulation portion is in a cylindrical shape and configured to abut against an inner surface of a housing of the battery. The terminal assembly includes a terminal penetrating the insulating cover and the elastic cover.

16 Claims, 4 Drawing Sheets

(51) Int. Cl.
*H01M 50/152* (2021.01)
*H01M 50/409* (2021.01)

(58) Field of Classification Search
CPC ............. H01M 50/553; H01M 50/567; H01M 50/543; H01M 50/109; H01M 50/148; H01M 50/176; H01M 50/153–154; H01M 50/15; H01M 50/107; H01M 50/528; H01M 50/562; H01M 50/566; H01M 50/559; H01M 50/56; H01M 50/552; H01M 50/548; H01M 50/545; H01M 50/181; H01M 50/182; H01M 50/155; H01M 50/157; H01M 50/16; H01M 50/162; Y02E 60/10; Y02P 70/50
See application file for complete search history.

(56) References Cited

U.S. PATENT DOCUMENTS

2012/0270084 A1* 10/2012 Yeh ..................... H01M 50/564
429/94
2018/0138464 A1* 5/2018 Brechling ........... H01M 50/167

* cited by examiner

COVER ASSEMBLY FOR BATTERY AND BATTERY

FIELD

The present application relates to the technical field of batteries, and particularly, to a cover assembly for a battery, and a battery.

BACKGROUND

In the related art, an insulating cover or a metal cover plate can be manufactured by one-piece molding technology and directly assembled with the housing. A pressing portion is usually formed on an outer wall of a housing by a rolling process. Due to the influences of the precision of the rolling process and the operating staff, it is difficult to ensure the sealing between the insulating cover and the housing, and a relative rotation may occur between the insulating cover and the housing, thereby affecting the normal use of the battery. At the same time, the fixation and connection between the insulating cover and the housing may be not firm enough, and the insulating cover has insufficient strength and thus it is likely to be damaged during installation.

SUMMARY

The present disclosure aims to solve at least one of the technical problems existing in the prior art. Therefore, a purpose of the present disclosure is to provide a cover assembly for a battery, which has a good structural reliability and good sealing effect.

In a first aspect, the cover assembly for the battery according to the embodiments of the present disclosure includes an elastic cover, an insulating cover, a frame support member, and a terminal assembly. The insulating cover is embedded in one end of the elastic cover. The frame support member has a greater hardness than the elastic cover and the insulating cover. The frame support member is embedded in the other end of the elastic cover. The terminal assembly includes a terminal penetrating the insulating cover and the elastic cover. The elastic cover is engaged with at least one of the insulating cover and the terminal assembly through a recess-protrusion structure, and the terminal penetrates the recess-protrusion structure.

In the cover assembly for the battery core according to the embodiments of the present disclosure, the recess-protrusion structure can facilitate the installation and positioning of the insulating cover, the terminal assembly and the elastic cover, and it can also prevent the insulating cover and the elastic cover from being pressed by the terminal to loosen after the terminal is installed, improving the air tightness of the insulating cover, the elastic cover and the terminal and improving the sealing effect.

In some embodiments, the elastic cover has an encapsulation portion disposed on an outside, in a radial direction, of the insulating cover and the frame support member; the encapsulation portion is in a cylindrical shape and configured to abut against an inner surface of a housing of the battery.

In some embodiments, the insulating cover has a first boss disposed on a bottom end surface thereof, and the elastic cover has a first recess defined on a bottom end surface thereof, the first boss being inserted into the first recess, and the terminal penetrating the first boss and the first recess.

In some embodiments, the terminal has a first positioning flange disposed at a bottom end thereof, and the insulating cover has an installation recess defined on a bottom end surface thereof, the first positioning flange being located in the installation recess.

In some embodiments, the terminal assembly further includes a fixing member, and a top end of the terminal abuts against a top end surface of the elastic cover through the fixing member.

In some embodiments, the elastic cover further has a second boss disposed on the top end surface thereof, and the fixing member has a second recess defined on a bottom end thereof, the second boss being inserted into the second recess, and the terminal penetrating the second boss and the second recess.

In some embodiments, the frame support member is an annular metal plate, and the elastic cover further has an annular separation protrusion disposed on a top end surface thereof, the fixing member and the annular metal plate are separable in a radial direction of the annular separation protrusion.

In some embodiments, the fixing member and the terminal protrude beyond the annular separation protrusion and the annular metal plate.

In some embodiments, the terminal is a riveting terminal and has a second positioning flange disposed at the top end thereof, the second positioning flange abutting against and being inserted into a top end of the fixing member.

In a second aspect, the battery according to the embodiments of the present disclosure includes a housing, a jelly roll, and the cover assembly as described in any one of the above-mentioned embodiments. The housing has an opening. The jelly roll is arranged in the housing.

The cover assembly is mounted at the opening of the housing.

In some embodiments, t the elastic cover has an encapsulation portion disposed on an outside, in a radial direction, of the insulating cover and the frame support member; the housing has a protruding structure formed at an inner surface thereof and protruding inwardly, the protruding structure pressing the encapsulation portion of the elastic cover in the radial direction, and the housing further has a folded edge at an end where the opening is located, the folded edge being bent towards an inner side of the encapsulation portion and pressing the encapsulation portion.

In some embodiments, the folded edge and the encapsulation portion pressed by the folded edge abut against an end surface of the frame support member.

Additional aspects and advantages of the present disclosure will be set forth in part from the following description and in part will become apparent from the following description, or they may be learned by practice of the present disclosure.

BRIEF DESCRIPTION OF DRAWINGS

The above and/or additional aspects and advantages of the present disclosure will become apparent and readily understood from the following description of embodiments in conjunction with the accompanying drawings.

Figure 1:
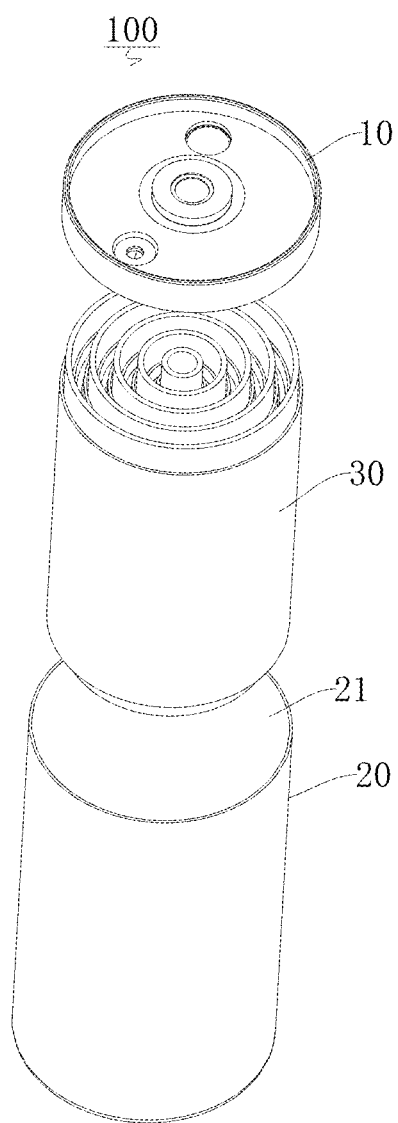
FIG. 1 is a perspective explosive view of a battery according to an embodiment of the present disclosure.

REFERENCE NUMBER battery 100;
cover assembly 10; elastic cover 11; encapsulation portion 111; first recess 112; second boss 113; annular separation protrusion 114; insulating cover 12; first boss 121; installation recess 122; frame support member 13; terminal assembly 14; terminal 141; first positioning flange 141a; second positioning flange 141b; fixing member 142; second recess 142a; protruding portion 142b; recess-protrusion structure 15;
housing 20; opening 21; protruding structure 22; folded edge 23;
jelly roll 30; negative electrode adapter 31;
predetermined direction A.

DESCRIPTION OF EMBODIMENTS

Embodiments of the present disclosure are described in detail below. The embodiments described with reference to the accompanying drawings are illustrative. A cover assembly 10 for a battery 100 and a battery 100 according to the embodiments of the present disclosure are described below with reference to FIG. 1 to FIG. 5.

In order to meet different power requirements, a battery may include a plurality of batteries. The battery may also be referred to as a battery 100. The plurality of batteries 100 may be connected in series, in parallel, or in a mixed connection. A mixed connection refers to a combination of a connection in series and a connection in parallel. That is to say, the plurality of batteries 100 can be directly arranged in a battery box to constitute the battery. Of course, the battery 100 is not limited to being assembled into the battery, and it may also be used as an independent charging and discharging element.

The battery 100 includes a housing 20, and a main body (e.g., a jelly roll 30, or a laminated structure formed by stacking positive electrode sheets and negative electrode sheets) of the battery 100 disposed in the housing 20. For a square battery 100, the housing 20 is in a shape of a cuboid; and for a cylindrical battery 100, the housing 20 of the battery 100 may be in a cylindrical shape. The housing 20 has an inner space for accommodating the main body of the battery 100 and the electrolyte, and an opening 21 in communication with the inner space. The jelly roll 30 can be arranged in the housing 20 through the opening 21. The housing 20 may be made of a material such as aluminum, aluminum alloys, or plastic.

The cover assembly 10 may also be referred to as an end cover assembly, and it is configured to seal the opening 21 of the housing 20. For the cylindrical battery 100 as illustrated in FIG. 1, the cover assembly 10 is in a shape of a disc. For a square battery 100, the cover assembly 10 has correspondingly a substantially square shape.

In a first aspect, for the cover assembly 10 for the battery 100 and the battery 100 according to the embodiments of the present disclosure, the cover assembly 10 for the battery 100 includes an elastic cover 11, an insulating cover 12, a frame support member 13, and a terminal assembly 14.

In an embodiment, the insulating cover 12 is embedded in one end of the elastic cover 11, and the frame support member 13 is embedded in the other end of the elastic cover 11. The elastic cover 11 has an encapsulation portion 111 located on an outside, in a radial direction, of the insulating cover 12 and the frame support member 13. The encapsulation portion 111 is in a shape of cylindrical. The encapsulation portion 111 is configured to abut against an inner surface of the housing 20 of the battery 100. A terminal 141 of the terminal assembly 14 penetrates the insulating cover 12 and the elastic cover. 11. The elastic cover 11 is engaged with at least one of the insulating cover 12 and the terminal assembly 14 through a recess-protrusion structure 15, and the terminal can penetrate the recess-protrusion structure 15.

As illustrated in FIG. 1 to FIG. 5, in a predetermined direction A of the cover assembly 10, the frame support member 13, the elastic cover 11 and the insulating cover 12 are sequentially arranged in a direction facing away from the jelly roll 30 of the battery 100. Recesses and protrusions may be provided between the frame support member 13 and the elastic cover 11 and between the elastic cover 11 and the insulating cover 12. In this way, the frame support member 13 can be engaged with the elastic cover 11, and thus the frame support member 13 can be embedded into one side of the elastic cover 11; and the insulating cover 12 can be embedded into the other side of the elastic cover 11. From a side of the cover assembly 10 close to the jelly roll 30, the terminal 141 penetrates the insulating cover 12 and the elastic cover 11, sequentially.

Figure 3:
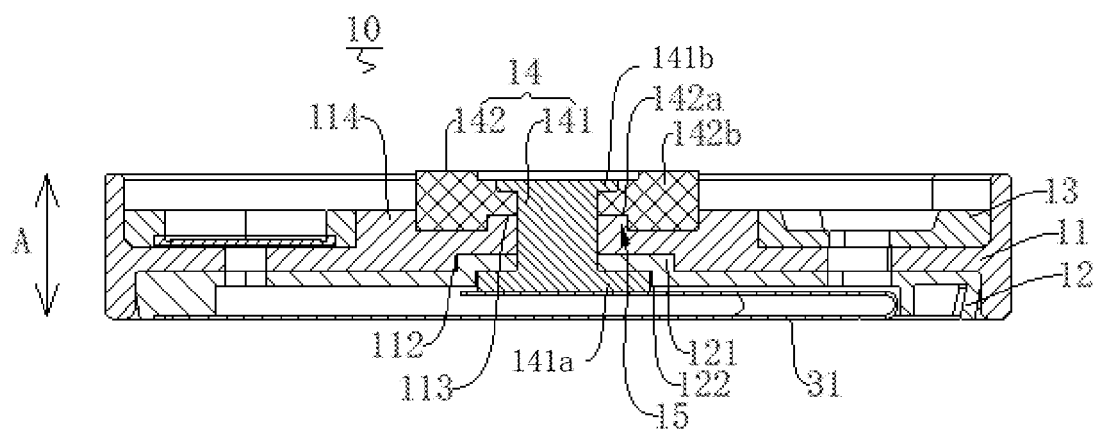
FIG. 3 is a cross-sectional view of a cover assembly according to an embodiment of the present disclosure.
Figure 4:
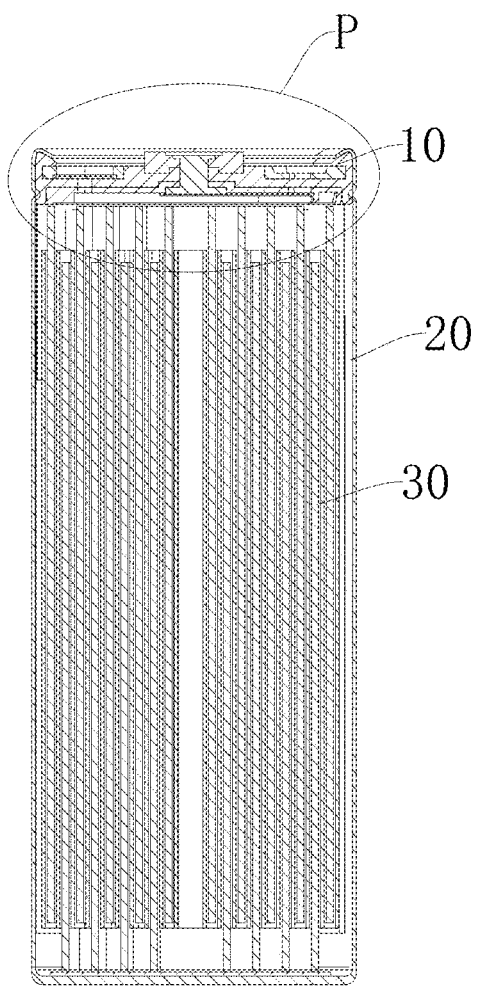
FIG. 4 is a cross-sectional schematic view of a battery according to an embodiment of the present disclosure.
Figure 5:
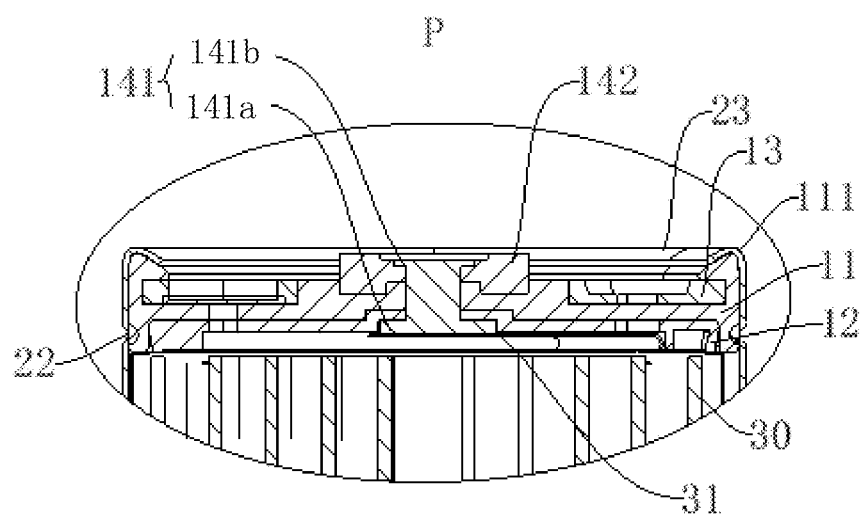
FIG. 5 is an enlarged view of region P in FIG. 4.

Optionally, as illustrated in FIG. 3 and FIG. 5, the elastic cover 11 is engaged with at least one of the insulating cover 12 and the terminal assembly 14 through the recess-protrusion structure 15, and the terminal 141 penetrates the recess-protrusion structure 15. For example, the elastic cover 11 may be engaged with the insulating cover 12 through the recess-protrusion structure 15, or the elastic cover 11 may be engaged with the terminal assembly 14 through the recess-protrusion structure 15. Furthermore, the elastic cover 11 can be engaged with the insulating cover 12 and the terminal assembly 14 through the recess-protrusion structure 15, which is not limited herein.

The recess-protrusion structure 15 refers to an engagement manner. For example, a protrusion disposed on a side of the elastic cover 11 facing away from the jelly roll 30 is engaged with a recess disposed on a side of a fixing member 142 close to the jelly roll 30 in the recess-protrusion engagement manner; and a recess disposed on a side of the elastic cover 11 close to the jelly roll 30 is engaged with a protrusion disposed on a side of the insulating cover 12 close to the elastic cover 11 in the recess-protrusion engagement manner.

In the cover assembly 10 for the battery 100 according to the embodiment of the present disclosure, the recess-protrusion structure 15 can facilitate the installation and positioning of the insulating cover 12, the terminal assembly 14, and the elastic cover 11, thereby improving the installation reliability and facilitating the improvement of the structural reliability of the cover assembly 10. At the same time, compared with an installation method of a plane-to-plane engagement, this arrangement can prevent the insulating cover 12 and the elastic cover 11 from being pressed by the terminal 141 to loosen after the terminal 141 is installed, thereby improving the air tightness of the insulating cover 12, the elastic cover 11 and the terminal 141 and improving the sealing effect.

Optionally, the elastic cover 11 has an encapsulation portion 111 located on the outside, in the radial direction, of the insulating cover 12 and the frame support member 13. The encapsulation portion 111 may be in a cylindrical shape, and the encapsulation portion 111 is configured to abut against an inner surface of the housing 20 of the battery 100.

As illustrated in FIG. 5, the elastic cover 11 has an encapsulation portion 111 provided along a circumferential direction thereof. The encapsulation portion 111 can be in contact with the inner surface of the housing 20 and can press the housing 20 at a side of the housing 20 facing away from the cover assembly 10. In this way, the housing 20 can be recessed inwardly (where the terminal assembly 14 is located) with the encapsulation portion 111.

Therefore, the elastic cover 11 has the encapsulation portion 111 disposed on the outside, in the radial direction, of the insulating cover 12 and the frame support member 13, and the cylindrical encapsulation structure facilitates the engaging and pressing between the cover assembly and the housing 20, thereby increasing the sealing performance between the cover assembly 10 and the housing 20.

For example, the frame support member 13 has a hardness greater than the elastic cover 11 and the insulating cover 12, and thus the frame support member 13 has a higher strength, thereby achieving the compression of the cover assembly 10 and reducing the height of the cover assembly in the predetermined direction. Thus, the structure of the cover assembly 10 is more compact and has a good structural reliability.

Further, as illustrated in FIG. 3, the insulating cover 12 has a first boss 121 disposed at a bottom end surface thereof. The elastic cover 11 has a first recess 112 defined at a bottom end surface thereof. The first boss 121 is inserted into the first recess 112, and the terminal 141 penetrates the first boss 121 and the first recess 112.

The first boss 121 protrudes from a side of the insulating cover 12 facing away from the elastic cover 11 towards a side where the elastic cover 11 is located, and accordingly, a recess is formed on the side of the insulating cover 12 facing away from the elastic cover 11. The elastic cover 11 located above the insulating cover 12 has the first recess 112 disposed on a side close to the insulating cover 12 and matching the first boss 121. The first recess 112 and the first boss 121 are fully engaged with each other in an axial direction of the terminal 141.

Thus, by providing the first boss 121 on the bottom end surface of the insulating cover 12 and the first recess 112 on the bottom end surface of the elastic cover 11, and by allowing the terminal 141 to penetrate the engaged first boss 121 and first recess 112, the installation and positioning of the insulating cover 12 and the elastic cover 11 can be facilitated, reducing the difficulty of installing the insulating cover 12 and the elastic cover 11, and tightening the installation structure of the insulating cover 12 and the elastic cover 11.

Specifically, as illustrated in FIG. 3 and FIG. 5, the terminal 141 has a first positioning flange 141a disposed at the bottom end thereof; the first boss 121 has an installation recess 122 disposed at the other end surface thereof; and the first positioning flange 141a protrudes into the installation recess 122.

The installation recess 122 formed on a side of the insulating cover 12 facing away from the elastic cover 11 can be installed and engaged with the first positioning flange 141a of the terminal 141. Thus, the insulating cover 12 and the elastic cover 11 can be fixed through the terminal 141, which reduces the occupation of the inner space of the cover assembly 10 by the terminals 141, optimizing the space structure between the cover assembly 10 and the housing 20.

Optionally, as illustrated in FIG. 3, the terminal assembly 14 may further include a fixing member 142. The top end of the terminal 141 abuts against the top end surface of the elastic cover 11 through the fixing member 142.

Figure 2:
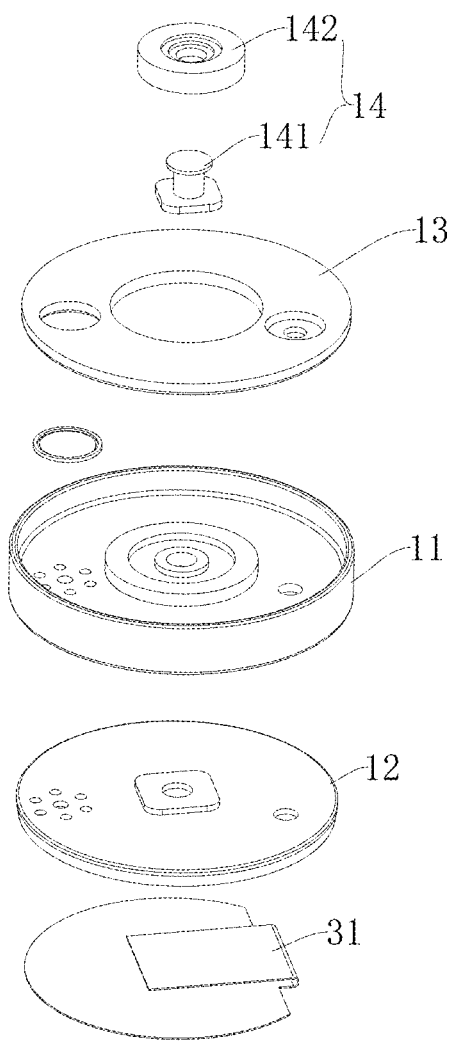
FIG. 2 is a perspective explosive view of a cover assembly according to an embodiment of the present disclosure.

As illustrated in FIG. 2 and FIG. 3, the terminal 141 sequentially penetrates the insulating cover 12, the elastic cover 11, and the fixing member 142, and through the fixing member 142, the terminal 141 is fixed to a plurality of covers disposed on the side of the elastic cover 11 facing away from the insulating cover 12. The top end of the terminal 141 is fixed to the fixing member 142, and the bottom end of the terminal 141 abuts against the insulating cover 12.

Therefore, by arranging the fixing member 142 on the side of the elastic cover 11 facing away from the insulating cover 12, it is convenient to fix the terminal 141 penetrating the insulating cover 12 and the elastic cover 11, thereby increasing the stability and firmness of the connection of the cover assembly through the fixing member 142.

In the embodiment illustrated in FIG. 3, the elastic cover 11 further has a second boss 113 disposed at the top end surface thereof; the fixing member 142 has a second recess 142a defined on a bottom end thereof; the second boss 113 is inserted into the second recess 142a; and the terminal 141 penetrates the second boss 113 and the second recess 142a.

An annular second recess 142a may be defined in a side of the fixing member 142 close to the elastic cover 11, and an annular second boss 113 may be disposed on a side of the elastic cover 11 facing away from the insulating cover 12. A cross-sectional area of the second recess 142a and a cross-sectional area of the second boss 113 are both greater than a cross-sectional area of the terminal 141. The terminal 141 penetrates the annular second boss 113 and the circular second recess 142a, and the terminal 141 is located at a middle part of the second boss 113 and the second recess 142a.

Therefore, by providing the second boss 113 on the top end surface of the elastic cover 11 and the second recess 142a on the bottom end of the fixing member 142, the fixing member 142 can match the elastic cover 11, a height of the fixing member 142 can be reduced, such that the cover assembly 10 can have an increased electrical conductivity, and the position limiting of the fixing member 142 is increased. In this way, the fixing member 142 can be quickly installed with the elastic cover 11.

For example, the recess-protrusion structure 15 as described above may include: a second boss 113 disposed on the side of the elastic cover 11 facing away from the jelly roll 30; a second recess 142a defined on the side of the fixing member 142 close to the jelly roll 30; a first recess 112 defined on the side of the elastic cover 11 close to the insulating cover 12; and a first boss 121 disposed on the side of the insulating cover 12 close to the elastic cover 11.

In some embodiments, as illustrated in FIG. 2, the frame support member 13 may be an annular metal plate. The elastic cover 11 further has an annular separation protrusion 114 disposed on the top end surface thereof. The fixing member 142 and the annular metal plate are separable in a radial direction of the annular separation protrusion 114. For example, as illustrated in FIG. 2 and FIG. 3, the annular separation protrusion 114 is disposed on an outer side of the second boss 113, and the annular separation protrusion 114 and the second boss 113 are sequentially arranged away from the terminal 141 in the radial direction of the terminal 141. An installation recess 122 for accommodating the fixing member 142 is defined between the second boss 113 and the annular separation protrusion 114. An inner wall of the annular metal plate and an outer wall of the annular separation protrusion 114 are in contact with each other, and the annular separation protrusion 114 and the elastic cover 11 can be formed by integral molding technology.

Therefore, by providing the annular cover on the top end surface of the elastic cover 11 to separate the annular metal plate from the fixing member 142, a short circuit of the cover assembly 10, which may be caused by a contact between the annular metal plate and the fixing member 142, can be avoided, thereby increasing the safety of the cover assembly 10. The annular metal plate embedded into the elastic cover 11 can increase the structural strength of the cover assembly 10.

In some embodiments, as illustrated in FIG. 3, the fixing member 142 and the terminal 141 have each a protruding portion 142b protruding beyond the annular separation protrusion 114 and the annular metal plate. That is, in the predetermined direction A of the cover assembly 10, an end surface of the fixing member 142 and the terminal 141 on a side facing away from the elastic cover 11 protrudes out of an end surface of the annular separation protrusion 114 and the annular metal plate on a side facing away from the elastic cover 11.

Therefore, the protruding fixing member 142 and the terminal 141 facilitate the engaging of the terminal 141 with the insulating cover 12 and the elastic cover 11, and thus the fixing member 142 can be easily fixed to the terminal 141. Thus, the structure of the cover assembly 10, which is constituted by the terminal 141, the fixing member 142, the insulating cover 12, and the metal cover plate, is more reliable.

Optionally, as illustrated in FIG. 3, the terminal 141 is a riveting post. The terminal 141 has a second positioning flange 141b disposed at the top end thereof. The second positioning flange 141b abuts against and is inserted into the top end of the fixing member 142. Therefore, by providing the second positioning flange 141b at the end of the terminal 141 facing away from the insulating cover 12, the cross-sectional area of the second positioning flange 141b can be larger than the cross-sectional area of the terminal 141 located inside the insulating cover 12. In this way, the fixing member 142 can be pressed at the end of the fixing member 142, thereby increasing the tightness of the structure of the fixing member 142, the elastic cover 11 and the insulating cover 12 can be increased, and improving the structural strength of the cover assembly 10.

In a second aspect, the battery 100 according to the embodiments of the present disclosure includes a housing 20, a jelly roll 30, and the cover assembly 10 as described in any one of the above-mentioned embodiments. The housing 20 has an opening 21. The jelly roll 30 is placed in the housing 20, and the cover assembly 10 is mounted at the opening 21 of the housing 20.

As illustrated in FIG. 1 to FIG. 5, in a direction of a central axis of the jelly roll 30 (for example, in the predetermined direction A as illustrated in FIG. 3), the cover assembly 10 includes the insulating cover 12, the elastic cover 11, the frame support member 13, and the terminal post fixing member 142 that are sequentially arranged away from the jelly roll 30. The terminal 141 sequentially penetrates the insulating cover 12 and the elastic cover 11 and is fixed to the fixing member 142. A side of the terminal 141 close to the jelly roll 30 is connected to a negative electrode adapter 31. An inner side of the negative adapter 31 facing away from the terminal 141 is connected to a tab (not shown), and the other end of the tab is electrically connected to the jelly roll 30, such that the terminal 141 and the jelly roll 30 can be in communication with each other, thereby achieving the normal charging and discharging of the battery 100.

Thus, the cover assembly 10 is assembled at the opening 21 of the housing 20, the jelly roll 30 is located inside the housing 20, achieving the sealing of the battery 100, and increasing the sealing performance of the battery 100 and the safety of use.

Optionally, as illustrated in FIG. 5, the elastic cover 11 has the encapsulation portion 111 located the outside, in the radial direction, of the insulating cover 12 and the frame support member 13. A protruding structure 22 protruding inwardly is formed on an inner surface of the housing 20. The protruding structure 22 presses the encapsulation portion of the elastic cover 11 in the radial direction. The housing 20 has a folded edge 23 at an end where the opening 21 is located. The folded edge 23 is bent towards an inner side of the encapsulation portion 111 and presses the encapsulation portion 111.

Specifically, the protruding structure 22 may be an annular recess formed by rolling the side wall of the housing 20, and a bottom wall of the recess protrudes toward an interior of the housing 20. Of course, the protruding structure 22 may also be formed by other processes or processing methods. The protruding structure 22 may be directly formed by the housing 20, or it may be fixed to an inner wall of the housing 20 by means of connection. The above examples are all covered by the protection scope of the present disclosure.

As a result, by forming the sealing of the side pressing and the top folded edge 23, the sealing performance of the battery 100 is better.

In some embodiments, the frame support member 13 is embedded in the end of the elastic cover 11; the folded edge 23, and the encapsulation portion 111 pressed by the folded edge 23 abut against an end surface of the frame support member 13.

In this way, the folded edge 23 can have triple functions of fixing, limiting and sealing the top part of the elastic cover 11, and it can also limit and position the frame support member 13 to apply an abutting force down to the frame support member 13, preventing the frame support member 13 from loosening from the elastic cover 11.

Therefore, the frame support member 13 is embedded in the end part of the elastic cover 11, and the folded edge 23 is bent toward the center of the cover assembly 10, such that the folded edge 23, together with the encapsulation portion 111, is bent from the outer wall of the housing 20 towards the inner wall of the housing 20. The free end of the folded edge 23 can abut against the frame support member 13 to increase the tightness of the connection between the cover assembly 10 and the housing 20 to increase the sealing performance of the entire battery 100, thereby strengthening the structure of the battery 100 and prolonging the service life of the battery 100.

In the specification, terms such as "central", "length", "width", "thickness", "upper", "lower", "front", "rear", "left", "right", "vertical", "horizontal", "top", "bottom", "inner", "outer", "axial", "radial", and "circumferential direction" should be construed to refer to the orientation or direction as illustrated in the drawings. These terms are only for the convenience and simplification of description, rather than indicating or implying that the involved apparatuses or elements must have a specific orientation or must be constructed and operated in a specific orientation. Therefore, these terms should not be construed as limitations on the present disclosure.

In the specification, "first feature" and "second feature" may include one or more of the features. In the specification, "plurality of" means two or more. In the specification, a first feature "above" or "under" a second feature may include that the first and second features are in direct contact, or that the first and second features, instead of being in the direct contact, are in contact through an additional feature disposed therebetween. In the specification, the first feature "above", "on" and "over" the second feature includes that the first feature is directly above and obliquely above the second feature, or the first feature is at a higher level than the second feature.

Throughout this specification, reference to "an embodiment", "some embodiments", "an illustrative embodiment", "an example", "specific examples" or "some examples" indicates that a particular feature, structure, material, or characteristic described in connection with the embodiment or example is included in at least one embodiment or example of the present disclosure. Thus, the appearances of the above phrases throughout this specification are not necessarily referring to the same embodiment or example.

Although the embodiments of the present disclosure have been illustrated and described above, it will be understood by those of ordinary skill in the art that various changes, modifications, substitutions and alterations can be made to these embodiments without departing from the principles and spirit of the present disclosure. The scope of the disclosure is defined by the claims and their equivalents.

What is claimed is:

1. A cover assembly for a battery, the cover assembly comprising:
   an elastic cover;
   an insulating cover embedded in one end of the elastic cover;
   a frame support member embedded in the other end of the elastic cover; and
   a terminal assembly, comprising a terminal penetrating the insulating cover and the elastic cover,
   wherein the elastic cover is engaged with at least one of the insulating cover and the terminal assembly through a recess-protrusion structure, and wherein the terminal penetrates the recess-protrusion structure,
   wherein the terminal assembly further comprises a fixing member, and a top end of the terminal abuts against a top end surface of the elastic cover via the fixing member,
   wherein the frame support member is an annular metal plate, and the elastic cover further has an annular separation protrusion disposed on a top end surface thereof, the fixing member and the annular metal plate are separable in a radial direction of the annular separation protrusion.

2. The cover assembly for the battery according to claim 1, wherein
   the elastic cover has an encapsulation portion disposed on an outside, in a radial direction, of the insulating cover and the frame support member, the encapsulation portion being in a cylindrical shape and configured to abut against an inner surface of a housing of the battery.

3. The cover assembly for the battery according to claim 1, wherein:
   the insulating cover has a first boss disposed on a bottom end surface thereof, and
   the elastic cover has a first recess defined on a bottom end surface thereof, the first boss being inserted into the first recess, the terminal penetrating the first boss and the first recess.

4. The cover assembly for the battery according to claim 3, wherein:
   the terminal has a first positioning flange disposed at a bottom end thereof, and
   the insulating cover has an installation recess defined on a bottom end surface thereof, the first positioning flange being located in the installation recess.

5. The cover assembly for the battery according to claim 1, wherein:
   the elastic cover further has a second boss disposed on the top end surface thereof, and
   the fixing member has a second recess defined on a bottom end thereof, the second boss being inserted into the second recess, the terminal penetrating the second boss and the second recess.

6. The cover assembly for the battery according to claim 1, wherein the fixing member and the terminal protrude beyond the annular separation protrusion and the annular metal plate.

7. The cover assembly for the battery according to claim 1, wherein the terminal is a riveting terminal and has a second positioning flange disposed at the top end thereof, the second positioning flange abutting against and being inserted into a top end of the fixing member.

8. A battery, comprising:
   a housing, having an opening;
   a jelly roll style electrode assembly arranged in the housing; and
   a cover assembly mounted at the opening of the housing, the cover assembly comprising:
   an elastic cover;
   an insulating cover embedded in one end of the elastic cover;
   a frame support member embedded in the other end of the elastic cover; and
   a terminal assembly, comprising a terminal penetrating the insulating cover and the elastic cover,
   wherein the elastic cover is engaged with at least one of the insulating cover and the terminal assembly through a recess-protrusion structure, and wherein the terminal penetrates the recess-protrusion structure,
   wherein the terminal assembly further comprises a fixing member, and a top end of the terminal abuts against a top end surface of the elastic cover via the fixing member,
   wherein the frame support member is an annular metal plate, and the elastic cover further has an annular separation protrusion disposed on a top end surface thereof, the fixing member and the annular metal plate are separable in a radial direction of the annular separation protrusion.

9. The battery according to claim 8, wherein the elastic cover has an encapsulation portion disposed on an outside, in a radial direction, of the insulating cover and the frame support member, the encapsulation portion being in a cylindrical shape and configured to abut against an inner surface of a housing of the battery.

10. The battery according to claim 8, wherein:
    the insulating cover has a first boss disposed on a bottom end surface thereof, and
    the elastic cover has a first recess defined on a bottom end surface thereof, the first boss being inserted into the first recess, the terminal penetrating the first boss and the first recess.

11. The battery according to claim 10, wherein:
    the terminal has a first positioning flange disposed at a bottom end thereof, and
    the insulating cover has an installation recess defined on a bottom end surface thereof, the first positioning flange being located in the installation recess.

12. The battery according to claim 8, wherein:
    the elastic cover further has a second boss disposed on the top end surface thereof, and
    the fixing member has a second recess defined on a bottom end thereof, the second boss being inserted into the second recess, the terminal penetrating the second boss and the second recess.

13. The battery according to claim 8, wherein the fixing member and the terminal protrude beyond the annular separation protrusion and the annular metal plate.

14. The battery according to claim 8, wherein the terminal is a riveting terminal and has a second positioning flange disposed at the top end thereof, the second positioning flange abutting against and being inserted into a top end of the fixing member.

15. The battery according to claim 8, wherein:
the elastic cover has an encapsulation portion disposed on an outside, in a radial direction, of the insulating cover and the frame support member,
the housing has a protruding structure formed at an inner surface thereof and protruding inwardly, the protruding structure pressing the encapsulation portion of the elastic cover in the radial direction, and
the housing further has a folded edge at an end where the opening is located, the folded edge being bent towards an inner side of the encapsulation portion and pressing the encapsulation portion.

16. The battery according to claim 15, wherein the folded edge and the encapsulation portion pressed by the folded edge abut against an end surface of the frame support member.

\* \* \* \* \*